(12) United States Patent
Autio et al.

(10) Patent No.: US 10,963,067 B2
(45) Date of Patent: Mar. 30, 2021

(54) MULTILAYOUT KEYBOARD

(71) Applicant: Microsoft Technology Licensing, LLC, Redmond, WA (US)

(72) Inventors: Henri Antero Autio, Redmond, WA (US); Joni Kristian Arola, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/285,139

(22) Filed: Feb. 25, 2019

(65) Prior Publication Data
US 2020/0272244 A1    Aug. 27, 2020

(51) Int. Cl.
*G06F 3/02* (2006.01)
*H01H 13/02* (2006.01)

(52) U.S. Cl.
CPC ......... *G06F 3/0219* (2013.01); *H01H 13/023* (2013.01); *H01H 2013/026* (2013.01); *H01H 2219/056* (2013.01); *H01H 2219/064* (2013.01)

(58) Field of Classification Search
None
See application file for complete search history.

(56) References Cited

U.S. PATENT DOCUMENTS

| | | | |
|---|---|---|---|
| 5,164,723 A * | 11/1992 | Nebenzahl | G06F 3/0238 200/309 |
| 5,748,177 A | 5/1998 | Baker et al. | |
| 5,975,711 A * | 11/1999 | Parker | G02B 6/006 200/314 |
| 8,432,362 B2 | 4/2013 | Cheng et al. | |
| 9,864,516 B2 | 1/2018 | Berger et al. | |
| 2009/0128492 A1* | 5/2009 | Yoo | G06F 3/0219 345/168 |
| 2011/0090151 A1 | 4/2011 | Huang et al. | |
| 2012/0068933 A1 | 3/2012 | Larsen | |

FOREIGN PATENT DOCUMENTS

| | | |
|---|---|---|
| CN | 206805471 U | 12/2017 |
| EP | 3012733 A1 | 4/2016 |

OTHER PUBLICATIONS

Larsen, Larry, "Microsoft's Adaptive Keyboard at UIST", Retrieved From: https://channel9.msdn.com/posts/Microsofts-Adaptive-Keyboard-at-UIST, Oct. 19, 2010, 15 Pages.
"International Search Report and Written Opinion Issued in PCT Application No. PCT/US2020/017400", dated May 4, 2020, 13 Pages.

* cited by examiner

*Primary Examiner* — Thomas S McCormack (57) ABSTRACT

A keyboard having multiple layouts includes depressible keys. A light reflector is positioned under at least some of the depressible keys with light sources configured to emit light towards the light reflectors. The light impinges on one of a plurality of reflective surfaces of the light reflectors and is reflected towards a corresponding depressible key under which the light reflector is positioned to cause a character or symbol to appear on a surface of the depressible keys. A switch allows a user to selectively control the character or symbol appearing on the surfaces of the depressible keys, resulting in more efficient input for the multiple layouts that improves the user experience.

20 Claims, 8 Drawing Sheets

MULTILAYOUT KEYBOARD

BACKGROUND

Computer peripherals, such as keyboards, have continually expanding functionality with enhanced user experiences. For example, different types of hard and soft keyboards provide users with different functionality according to a particular application, setting, etc. On a hard keyboard, mechanically depressible keys are each associated with a particular user input, such as a particular character associated with the language of the keyboard. If a user desires to change the layout of the keyboard (e.g., switch between languages), such as to have the keys correspond to different letters, because the imprinting of the characters on each of the keys is static, the user has to memorize the reassigned key or use a displayed guide that shows the new assignment of the hard keys. For example, a layout of the keys in a different language is displayed that shows the new letters corresponding to each of the keys, which can block other content displayed on the screen.

However, the physical keys and the letters displayed thereon remain unchanged, resulting in the user sometimes having to guess or otherwise remember the new key assignments. This can cause confusion and adversely affect the overall user experience because of the tedious or burdensome nature of having to continually determine the new assignment of each of the keys. Moreover, in many instances, users instead opt for multiple physical keyboards, each with a specific desired input configuration. For example, a user may switch between a keyboard in one language (e.g., US/ENG) and a keyboard in a second different language (e.g., US/FIN or US/GRK), which again can be tedious and time consuming, thereby adversely affecting the user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A keyboard comprises a plurality of depressible keys and a light reflector positioned under at least some keys of the plurality of depressible keys. The keyboard further comprises a plurality of light sources configured to emit light towards the light reflectors. The light impinges on one of a plurality of reflective surfaces of the light reflectors and the light reflector reflects the light impinging on the reflective surface towards a corresponding key of the plurality of depressible keys under which the light reflector is positioned to cause a character or symbol to appear on a surface of the plurality of depressible keys. The keyboard further comprises a switch configured to control selectively enabling each of the light sources of the plurality of light sources to change the character or symbol appearing on the surfaces of the plurality of keys.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to allow multiple different layouts on a keyboard. For example, the keyboard layout, particularly the labels on keys of a physical keyboard can be changed to selectively show different input characters on the same keys. The multi-character display per key allows for a single keyboard to be used for multiple applications, such as for typing in multiple languages (e.g., English and Finnish or Greek).

In particular, some configurations described herein allow for a user to switch between multiple keyboard layouts or arrangements on a single physical keyboard. As a result, a more efficient input results that improves the user experience. In this manner, when a processor is programmed to perform the operations described herein to configure the keyboard in multiple different layouts or formats, the processor is used in an unconventional way, and allows more efficient user input, particularly across different languages or applications. That is, various configurations include a keyboard with physical input buttons having multiple dynamically switchable layouts.

In one configuration, controllable light sources illuminate keys on the keyboard to cause different characters or portions of characters to appear on the surface of the keys. For example, using a mirror or prism assembly, one or more symbols or characters are selectively turned on and off by tuning on and off the light sources. The light sources are controllable to be enabled and disabled to thereby cause different layouts to be presented by the keys of the keyboard, such as different languages, different symbols for specific applications, etc.

The various examples of the present disclosure are applicable to a variety of keyboards, keypads, and similar devices. Herein, the disclosure is presented primarily with respect to a computer keyboard. This is an exemplary application and not a limiting application. Cellular telephones, personal digital assistants (PDAs), remote controls, mobile audio devices, and a wide range of other devices that use keys for input are contemplated as being in the scope of the disclosure. Herein, the term keyboard is intended to also encompass keypads and similar devices.

Figure 1:
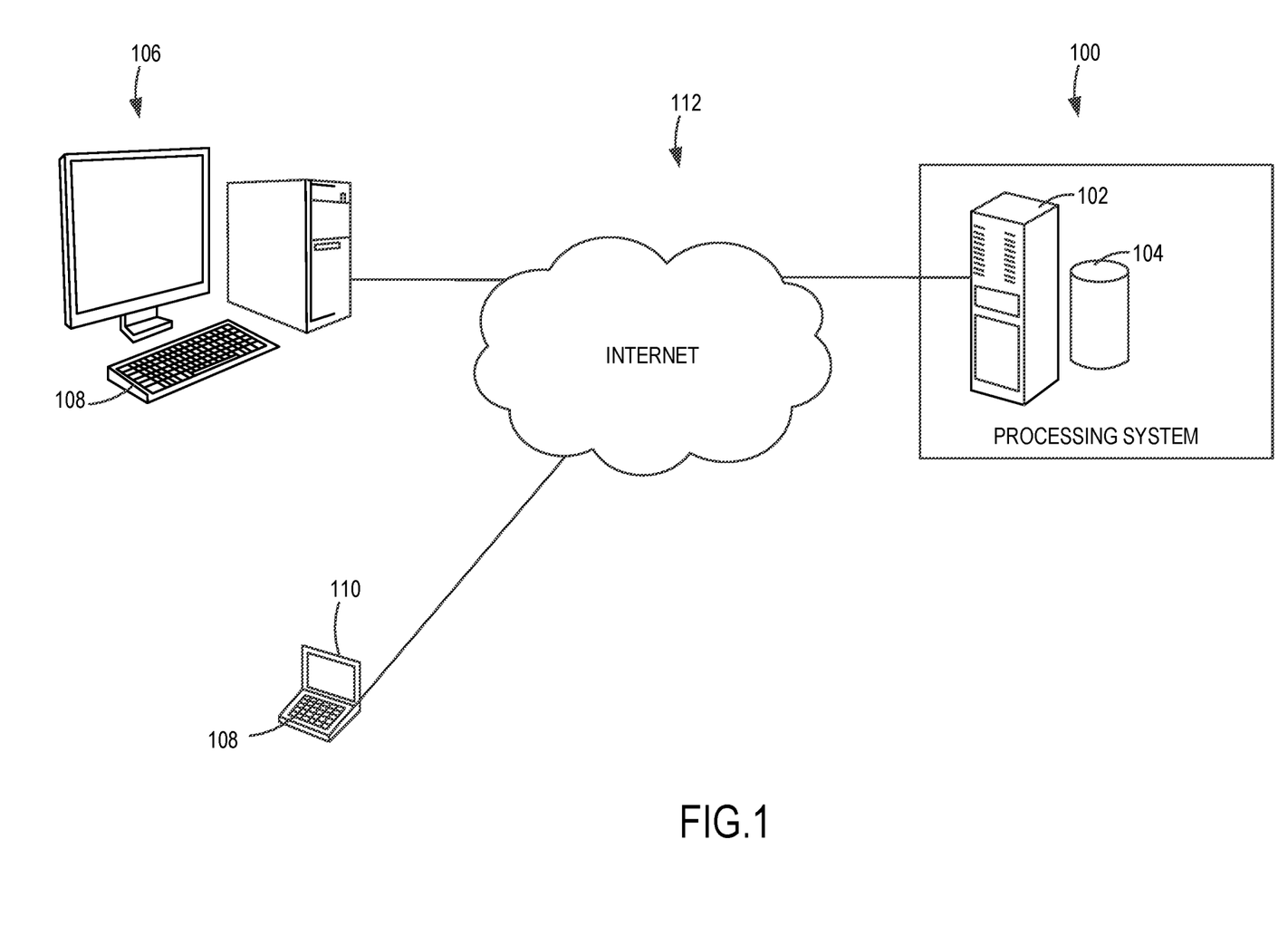
FIG. 1 is a block diagram illustrating a system having a keyboard according to an embodiment.

FIG. 1 is a schematic block diagram of a system 100 (e.g., a system having a multilayout keyboard) deployed as a cloud service in this example. The system 100 includes one or more computers 102 and storage 104 to store user inputs (e.g., inputs from physical key depression on the keyboard) in some examples. It should be appreciated that other data, such as information to be displayed with the input can be stored in the storage 104 and processed by the one or more computers 102 using the present disclosure.

The system 100 is connected to one or more end user computing devices in some examples, such as a desktop computer 106 having a keyboard 108 configured according to the present disclosure or a laptop computer 110 having the keyboard 108. Thus, it should be appreciated that keyboard configurations disclosed herein are not limited to a particular computing environment, but can be used in different configurations based on the specific hardware.

The system 100 is shown as connected to the end user computing devices via a computer network 112, illustrated as the Internet. The system 100 receives the input data from an end user computing device, which in various examples includes switching between different layouts of the keyboard 108, such as between different language layouts for typing by the user in the different languages.

Various examples allow the keys of the keyboard 108 to present different characters using controlled light steering to illuminate the characters for the selected keyboard layout (e.g., English keyboard layout, Finnish keyboard layout, Greek keyboard layout, etc.). For example, some or all of the mechanically depressible keys are each positioned over a mirror or prism to allow for selective illumination of a portion (e.g., a reflective surface) of the mirror or prism to control the character displayed on the corresponding key. In one example, each key is configured to allow reflected light forming the character corresponding to the selected keyboard layout to be displayed on an input surface of the key (e.g., a structured light pattern is displayed on a visible surface of the key).

In some examples, each key includes a keycap and is movably coupled to a mechanical understructure that guides movement of the keycap (e.g., guides reciprocating movement of the keycap and can provides a force response when the keycap is depressed that causes the keycap to return to an un-depressed state once released by the user) and that also allows for controllable light to define the character being displayed on the keycap. A transparent material or a plastic material with optical printing that is selectively illuminated form the keycap or top surface of the keys in some examples. However, it should be appreciated that any material capable of allowing the light representation of the character (e.g., letter or number) or symbol to be displayed can be used. That is, the dynamic displayable output of the keyboard 108 as viewed on or through the plurality of keys of the keyboard 108 allows for use of a single keyboard input device in a user-friendly configuration instead of using multiple keyboards with different desired layouts.

In one example, a central viewing window or display portion of the keycap is aligned with the mirror or prism associated with the keycap. The mechanical understructure is configured to not optically obstruct through-keycap viewing of changeable characters produced by reflected light from the mirror or prism. In some examples, the mechanical understructure is positioned outside of the central display region on each key to provide such unobstructed viewing. For example, the mechanical understructure can surround, but not intrude into the display region, or can be positioned to the side of the display region. Thus, configurations disclosed herein provide mechanical movement without obstructing the changeable input characters on the keys.

With the present disclosure, a computer peripheral input device, particularly a keyboard, thereby provides dynamic and changeable layouts that can be viewed through mechanically-depressible keys that are situated over the mirror or prism. The mechanical key movement in the keyboard 108 provides good tactile feel when typing, while the present disclosure allows for the indicia on the keys to be dynamic (e.g., the QWERTY labels on a conventional English keyboard can change to Finnish character labels or Greek character labels to thereby change the layout of the keyboard 108). Accordingly, various examples include keyboards having dynamic keyboard layouts and good mechanical feel when typing.

The terms "input" and "output" are used herein in reference to the keyboard functionality of the keyboard 108. When used in connection with a keyboard key, the term "input" generally refers to an input signal that is provided by the keyboard 108 upon activation of the key. "Output" generally refers to the display provided for a key, such as the displayed character, legend, icon or symbol that indicates the function of the key.

Figure 2:
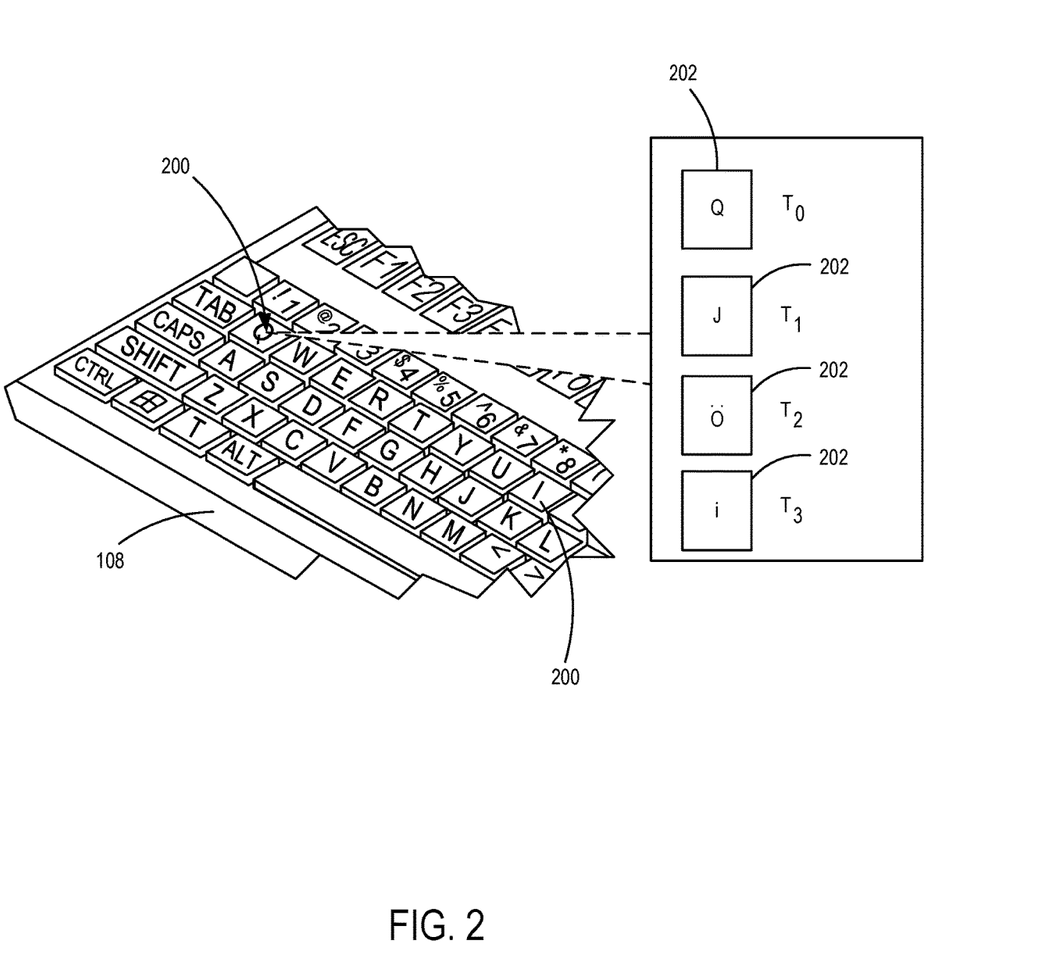
FIG. 2 illustrates a portion of a keyboard according to an embodiment that shows a changeable key.

As indicated by the "Q", "W", "E", "R", "T", "Y", etc., on keys 200 of the keyboard 108 as shown in FIG. 2, the keyboard provides a conventional English alphanumeric input capability for a particular application in some examples. It should be appreciated that to simplify the illustration, many keys in FIG. 2 are shown without indicia, however a label or display is often included for each key. Furthermore, in addition to or instead of the "QWERTY" layout, the keys 200 of the keyboard can be variously configured to provide other inputs. For example, the keys are assignable, namely dynamically changeable, to provide functionality for various languages and alphabets, and/or to activate other input commands for controlling the system 100. In some implementations, the key functions change dynamically, for example in response to the changing operational context of a software application running on the system 100 or based on a user input switching between the different available keyboard layouts or key representations. It should be understood that the keys in the present examples are selectively depressible to produce any type of input signal for controlling a computing device.

The keyboard 108 is configured to provide a wide variety of displayable output. For example, using selective illumination on the mirror or prism, the keys 108 with letters painted, printed or etched onto the keycap surface, or the mirror or prism with letters painted, printed or etched onto the surface thereof, or a mask having letters painted, printed or etched onto the surface thereof, etc. is used to indicate the "Q", "W", etc., functions of the keys. This dynamic and selectable display capability facilitates use of the keyboard 108 in a variety of different ways. For example, an English-based keyboard (layout) can be alternately mapped to provide letters in alphabetical order instead of the conventional "QWERTY" formulation or provide letters in a non-English language, and the character displayed for each key easily changed to reflect the different key assignments.

The displayed character capability contemplated herein is not limited to alphabets, letters, numbers, symbols, etc. The characters provided need not be associated with the input functionality of the keyboard. Images might be provided, for example, for aesthetic purposes, to personalize the user experience, or to provide other types of output. The present disclosure encompasses key displays for any purpose.

Figure 3:
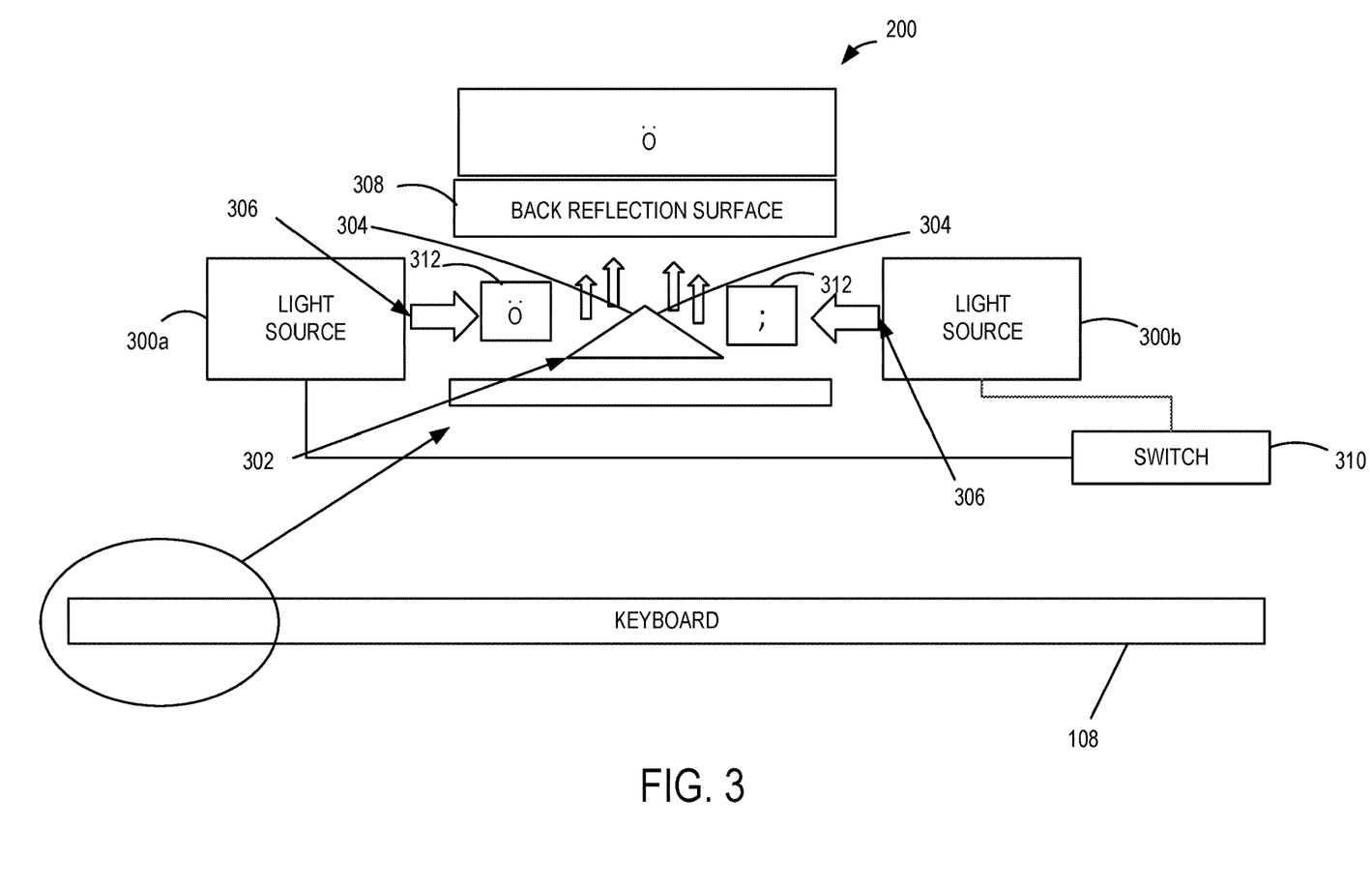
FIG. 3 illustrates a light guidance arrangement having a light reflector according to an embodiment.

With particular reference to FIG. 3, the keyboard 108 includes a plurality of lights sources 300 (e.g., light emitting diodes (LEDs)) optically coupled with a corresponding key 200 of the keyboard 108 to selectively control a character to be illuminated for display on the key 200. That is, the character or other symbol appears on the key 200. In the illustrated example, the key 200 is positioned above a light reflector, which is a prism 302 in this example, and has two reflective surfaces 304, which are opposing angled surfaces configured to reflect light 306 from the light sources 300 to the key 200. For example, the two reflective surfaces 304 are configured (e.g., angled) to reflect the light 306 to a back reflection surface 308 of the key 200.

It should be appreciated that in some examples, the material forming the key 200 and/or the back reflection surface 308 allows light to pass therethrough while preventing light scatter within the material. In this way, a sharp representation of the character or symbol is provided on a top surface of the key 200. For example, masking that blocks light from escaping between the keys 200 is provided in some configurations. This increases the contrast between the displayed characters or symbols and the background formed by the keys 200. This masking can be provided by separate masking material, which can be made of plastic, cardboard, or metal or some other suitable material, which blocks the gap between the keys 200, or by configuring the keys 200 so that the keys 200 block the gap, such as by overlapping the edges of the keys 200 so that one key 200 passes beneath the other.

Thus, the keyboard 200 includes a plurality of keys 200 disposed over and optically coupled to light sources 300 using one or more prisms 302. It should be appreciated that more than one prism 302 can be associated with a single key 200 or multiple keys 200 can be associated with a single prism 302. Additionally, while the prism 302 is illustrated with two reflective surfaces 304 allowing for at least two different characters to be displayed on the key 200, the prism 302 can have additional reflective surfaces 304 (e.g., three, four, five, or more reflective surfaces 304). It should be appreciated that other light reflectors or light guides can be used and configured to selectively guide or direct light that is structured to generate or cause to be displayed the particular character, symbol, icon, etc. on the key 200.

In operation, a switch 310, which can be a hardware configured switch or a software configured switch, is coupled with each of the lights sources 300 to selectively enable and disable the light sources 300. It should be appreciated that a separate switch is coupled to each of the light sources 300 in some examples. The switch 310 is operable to change an activation state of the light sources, namely, to turn on one of the lights sources 300 and turn off the other one of the lights sources 300 (corresponding to a particular key 200) to selectively illuminate one of the reflective surfaces 304 to cause reflected light with a light pattern (e.g., a letter, symbol, icon, etc.) to be directed towards the key 200. In the illustrated example, the light 306 passes through a corresponding mask 312 positioned between each of the light sources 300 and the prism 302 to generate a character on the key 200. In the illustrated embodiment, a character or symbol is provided on the mask 312, which is the Finnish letter "Ö" or the semicolon symbol ";" and configured as transparent regions of the mask 312 (with the remaining portions of the mask 312 being non-transparent). As should be appreciated, the light source 300a is turned on and the light source 300b is turned off in the illustrated example, such that the Finnish Ö is displayed om the key 200. Thus, multiple selectable modes of operation are provided having different keyboard layouts.

The mask 312 can be configured and formed in different ways to allow structured light to pass therethrough and be reflected by the prism 302. For example, a mask sheet can have a pattern corresponding to the desired letter or symbol etched thereon to allow light to pass through in the desired pattern to generate light that is structured (a structured light pattern) to have the letter or symbol. It should be appreciated that variations and modifications are contemplated. For example, the desired pattern can be etched or otherwise provided directly on the reflective surfaces 304 of the prism 302, such that the mask 312 is not used. In this configuration, the light 306 is reflected in a structured manner from the reflective surfaces 304 to create the desired character or symbol.

The keys 200 and the mask 312 can be constructed in various different manners. In one example, the body of the key 200 is constructed of a substantially opaque material such as a dark plastic. The characters or symbols are formed at portions of the key 200 that are capable of transmitting at least some light. These portions may be either transparent or translucent as desired. For example, a portion of the keys 200 are formed of a light transmitting material adapted to pass visible light. These portions will then display a character or symbol when lit from below by the light source 300 (e.g., a visible light source) that generates light 306 reflected by the prism 302.

In some examples, the transparent portions of the keys 200 or the mask 312 are uncolored. In other examples, a colored material that is complementary to visible light is used, such as a blue light source and a translucent yellow material for the symbol or character portion of the mask 312. The yellow material filters most or all of the blue light. Another example includes an overlay or coat to a fluorescent symbol of the mask 312 with a colored filter layer.

It should be noted that the layout of light sources 300 relative to the keys 200 can be tailored to the functionality of the keys 200 and can be balanced against cost and design factors. In some cases, the light sources 300 are be positioned behind, or beneath, the keys 300 and adjacent to the prism 302.

In an example for a smaller keypad, such as for a cellular phone or PDA, a single light bulb, or LED, can be used. Thus, a single pair of light sources 300 is sufficient for keys or rows of the keyboard 108.

In another example for a larger set of keys, such as a full sized conventional keyboard for a computer, multiple light sources 300, or a broad area light source is used in order to provide even illumination across the keys 200. An exemplary broad area light source suitable for use in keyboards and keypads is an LED array, but the present disclosure is not limited to a particular light source. For a larger keyboard or keypad, two or more light sources allow greater control over generating the characters or symbols. As should be appreciated, additional configurations and combinations thereof are contemplated.

Figure 4:
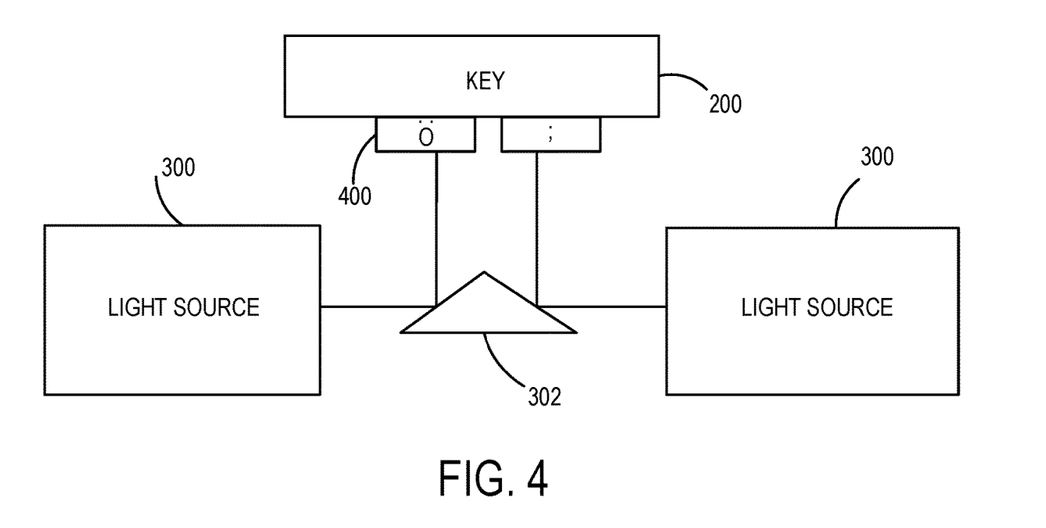
FIG. 4 illustrates a light guidance arrangement according to another embodiment.

Other variations include light configuration elements 400 as illustrated in FIG. 4 that are selectively illuminated to generate a corresponding character or symbol on a portion of the key 200 (illustrated as the right and left sides). For example, similar to the configuration of FIG. 3, the light sources 300 generate light that is reflected by the prism 302 towards the key 200. In this configuration, however, the light passes through one of the light configuration elements 400, such as located at a bottom of the key 200, depending on which of the light sources 300 is tuned on. Thus, similar to FIG. 3, the Finnish (Ö) or the semicolon symbol (;) is displayed on the key 200 depending on which one of the light configuration elements 400 the light passes through. The light configuration elements 400 can be configured similar to the mask 312. For example, a transparent region of the light configuration elements 400 can be configured or etched to have the Finnish (Ö) or the semicolon symbol (;) with the remainder of the light configuration elements 400 blocking light from passing therethrough. A portion of the key 200 is then caused on display the corresponding character or symbol on a portion of the key above the illuminated one of the light configuration elements 400. As should be appreciated, additional light configuration elements 400 can be used to allow for selective display of additional characters or symbols.

Other variations are contemplated. For example, in some configurations, the light configuration elements 400 form part of the key 200 and are formed of a light transmitting material that is adapted to fluoresce when excited by a non-visible light source such as ultra-violet (UV) light source. Thus, when the UV light source is active, the UV light will cause the character or symbol of the corresponding light configuration element 400 to fluoresce, emitting visible light that will cause the character or symbol to be displayed to the user.

In some examples, the light configuration elements 400 are uncolored. In other examples, a colored material that is complementary to visible light is used, such as a blue light source and a translucent yellow material for the symbol or character portion of the light configuration elements 400. The yellow material filters most or all of the blue light. Another example includes an overlay or coat to a fluorescent symbol of the light configuration elements 400 with a colored filter layer.

In still another example, the keys 200 have the light configuration elements 400 that form the characters or symbols that are intended to fluoresce of material that itself fluoresces. One technique to accomplish this configuration is to embed fluorescent powder in a light transmitting material and form the characters or symbols from that material. In some examples, none of the material used to form the symbols is fluorescent. Instead a fluorescent material is laid over the character or symbol of the light configuration elements 400 that is intended to be highlighted. When a UV light source causes the material to fluoresce, the emitted visible light will pass through the adjacent light transmitting portions. The fluorescent material can overlay either the inner surface or the outer surface of the light configuration elements 400.

Filtering of visible light, as discussed herein, can be achieved in different manners when an overlay is used. One example includes forming the symbol of a colored, but non-fluorescent material so that the symbol itself filters the complementary colored light. Another example is to use a colored, fluorescing material for the overlay. In this configuration, the overlay provides both the filtering and the fluorescence.

In one example, the keys 200 are constructed to limit the amount of ultraviolet light that escapes past the keys 200. In addition to the above-described masking, the keys 200 can be constructed to block or filter ultraviolet light. The opaque portions of the light configuration elements 400 are constructed of a material that blocks ultraviolet rays. In one example, the translucent portions of the light configuration elements 400 utilize material that filters ultraviolet while passing visible light. In another example, the light configuration elements 400 utilize material that filters enough ultraviolet to ensure that an unacceptable amount of light cannot pass through while allowing enough to penetrate the material so that the fluorescent material is excited.

Figure 5:
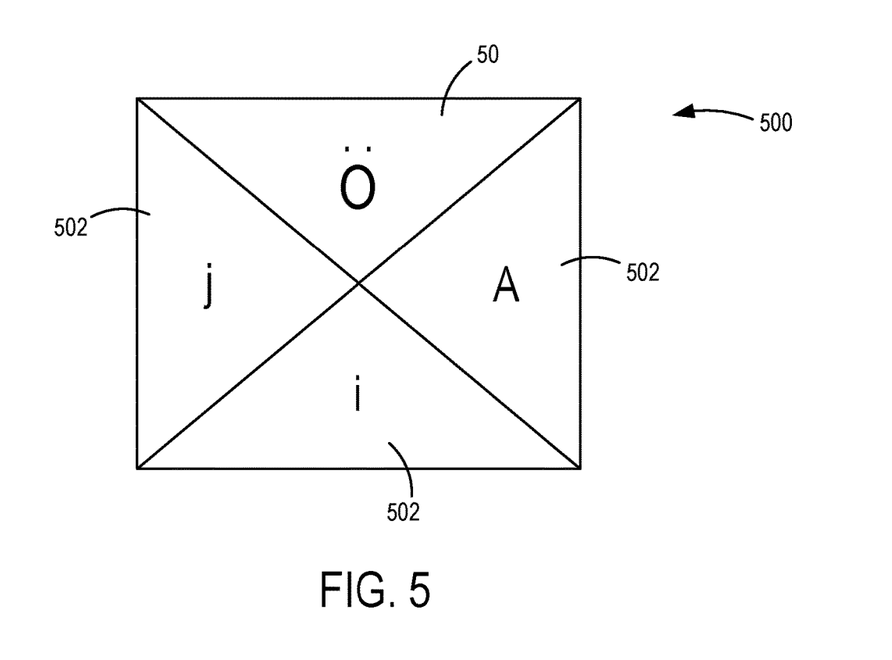
FIG. 5 illustrates a light reflector according to another embodiment.

As another example, and shown in FIG. 5, a prism 500 includes four reflective surfaces 502 (e.g., a multi-faceted prism) that allow for selective display of four different characters or symbols instead of two characters or symbols as provided by the configuration shown in FIG. 2. That is, in this configuration, one of the four characters (Ö, A, I, ;) is selectively displayed on the key 200 using the same operation described herein with respect to the other examples wherein light is directed onto the prism and reflected to the key 200. It should be noted that the four characters can be generated using a mask separate from the prism 500 or etched on the prism 500 as described in more detail herein. Moreover, the prism 500 can be configured to generate the character on a central portion of the key 200 or at a region of the key 200 (e.g., quadrant) where the key 200 is positioned above the prism 500.

Thus, the key 200 can take different configurations to allow the character or symbol to be displayed thereon. In one example, the key 200 is disposed over the prism 302 or 500 (or other prism or light reflector/guide) and optically coupled thereto as described herein. The key 200 in some configurations is at least partially transparent or otherwise configured to allow selective display of different characters or symbols. For example, a keycap for each key 200 in some examples has a central viewing window that is aligned with an associated prism 302 or 500. As such, structured light that is reflected towards the key 200 causes the corresponding character or symbol to appear on a top visible surface of the key 200.

It should be appreciated that different types of light sources can be used to illuminate the light reflector, such as the prism 302 or 500. For example, any type of controllable light source, such as an LED or other light sources, can be used in the various examples to generate light that is reflected from a surface to the key 200.

Thus, a single keyset (e.g., a single physical keyboard) is adapted for multiple applications or layouts, such as keyboard layouts corresponding to different countries. For example, and with reference again also to FIG. 2, the multiple characters or symbols displayable using the prism 302 of 500 is shown for one of the keys 200. In particular, the switchable display for the key character or symbol is shown respectively at times T0, T1, T2, and T3. It should be noted that the switching between the character or symbol can occur in a different order and the illustrated order is merely for example.

As can be seen, the displayed character or symbol output associated with key 200 is selectively changeable, for example to reflect the input command produced by depressing the key. However, as previously described, the viewable output provided by the keyboard 108 can take forms other than displays associated with individual keys and the corresponding input functionality. As can be seen, in the illustrated example, a user is able to change the appearance of the physical key 200 of the keyboard 108 to selectively display the following: Q, ;, Ö, and i. That is, the reflected light from the prism 302 or 500 that impinges on the key 200 causes the key 200 to appear to have a selected character or symbol, which in some examples is based on a selected county keyboard layout. However, as should be appreciated, the character or symbol that appears on the key 200 can be based on a particular application, input requirements, etc. and is not limited to different language keyboards.

It should also be appreciated that different mechanical structures and understructures can be used within the scope of the present disclosure. For example, any suitable structure that allows for depression of the keys 200 in combination with display of the character or symbol can be used. As such, any resilient member (e.g., spring member), bendable member, deformable member, etc. can be used. In various examples, the understructures, including the base structure, are configured to not interfere with the display of the characters or symbols. For example, the understructures are arranged around the prism 302 or 500.

Figure 6:
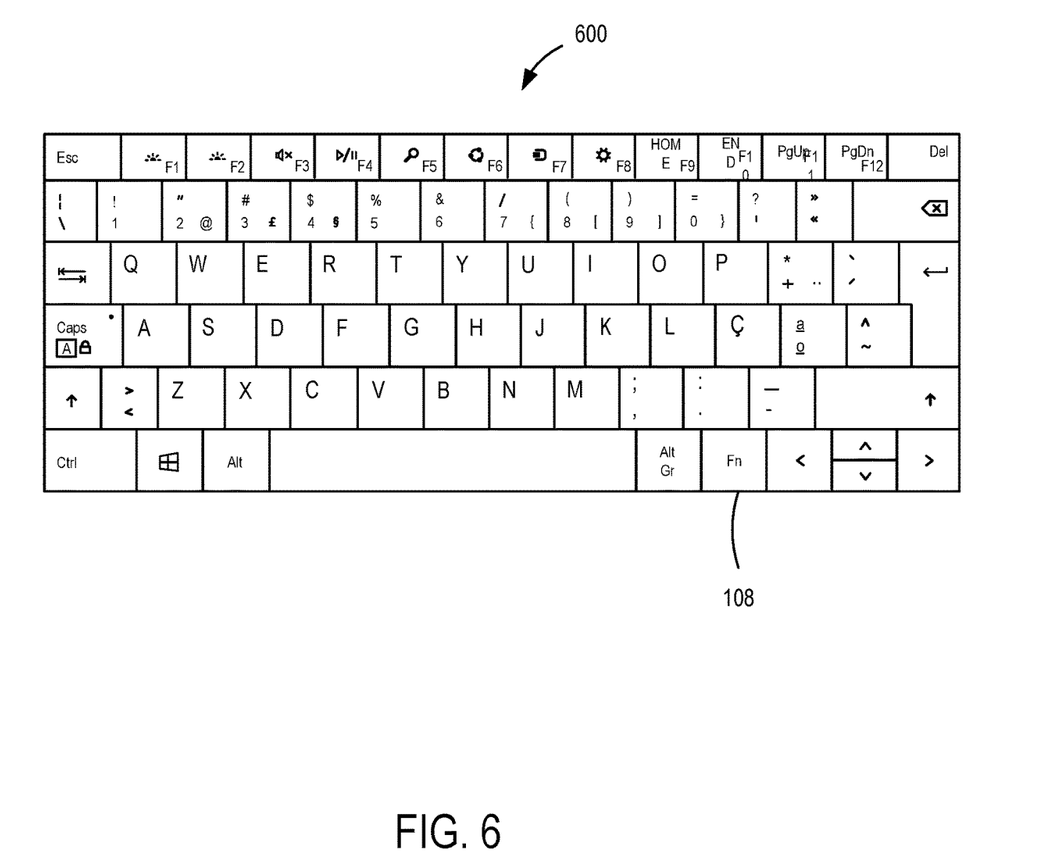
FIG. 6 illustrates a layout of a multilayout keyboard according to an embodiment showing one layout.
Figure 7:
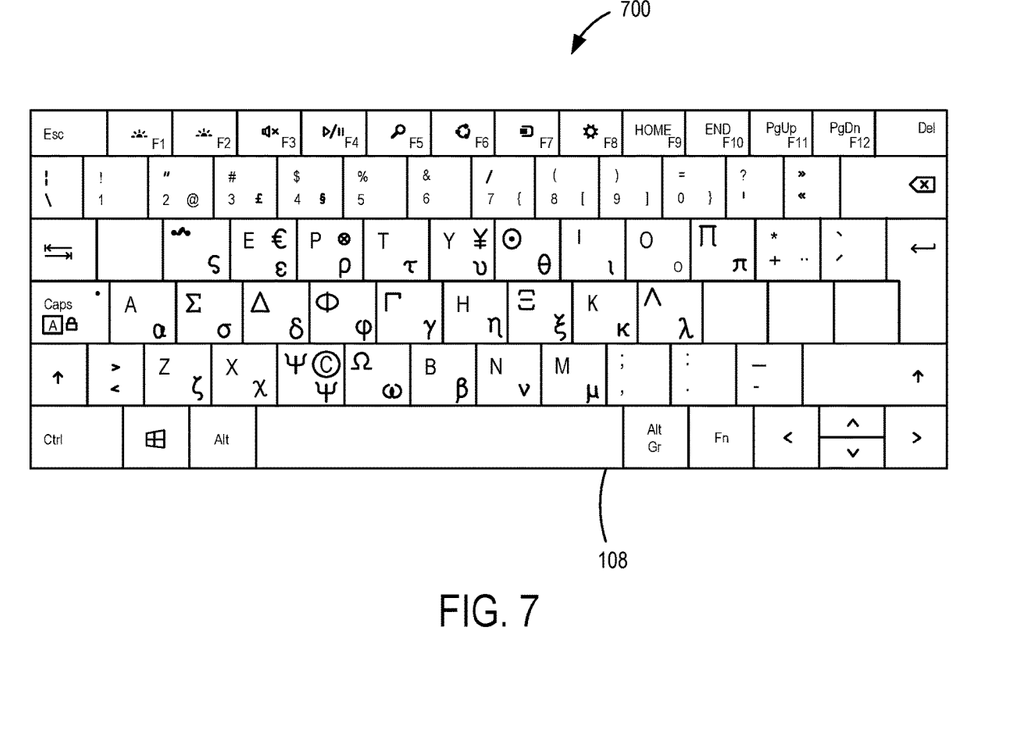
FIG. 7 illustrates another layout of the multilayout keyboard of FIG. 6.

Using a single keyset, namely a single physical keyboard, the present disclosure allows for multiple different layouts. As such, a multilayout keyboard having keys that are selectively changeable to different formats (e.g., different languages) allows a simplified user input. For example, as shown in FIGS. 6 and 7, two different layouts 600 and 700 are illustrated for the keyboard 108. In the illustrated example, the layout 600 is an English QWERTY-type layout and the layout 700 is a Greek letter keyboard layout. The physical structure of the keyboard 108 remains unchanged in FIGS. 6 and 7, but using light reflectors, such as the prism 302 or 500, each of the physical keys 200 can appear selectively with letters for the different languages. As a result, the user friendly feel of a physical keyboard is provided with the selectable features of a soft or virtual keyboard that allows for multiple input layouts (e.g., multiple language inputs) without having to switch between physical keyboards. It should be noted that if some of the keys do not have corresponding characters or symbols in the different layouts, such as in the layout 700 having less characters compared to layout 600, some of the keys do not have any character or symbol generated thereon (e.g., blank keys because the corresponding light source is disabled).

Figure 8:
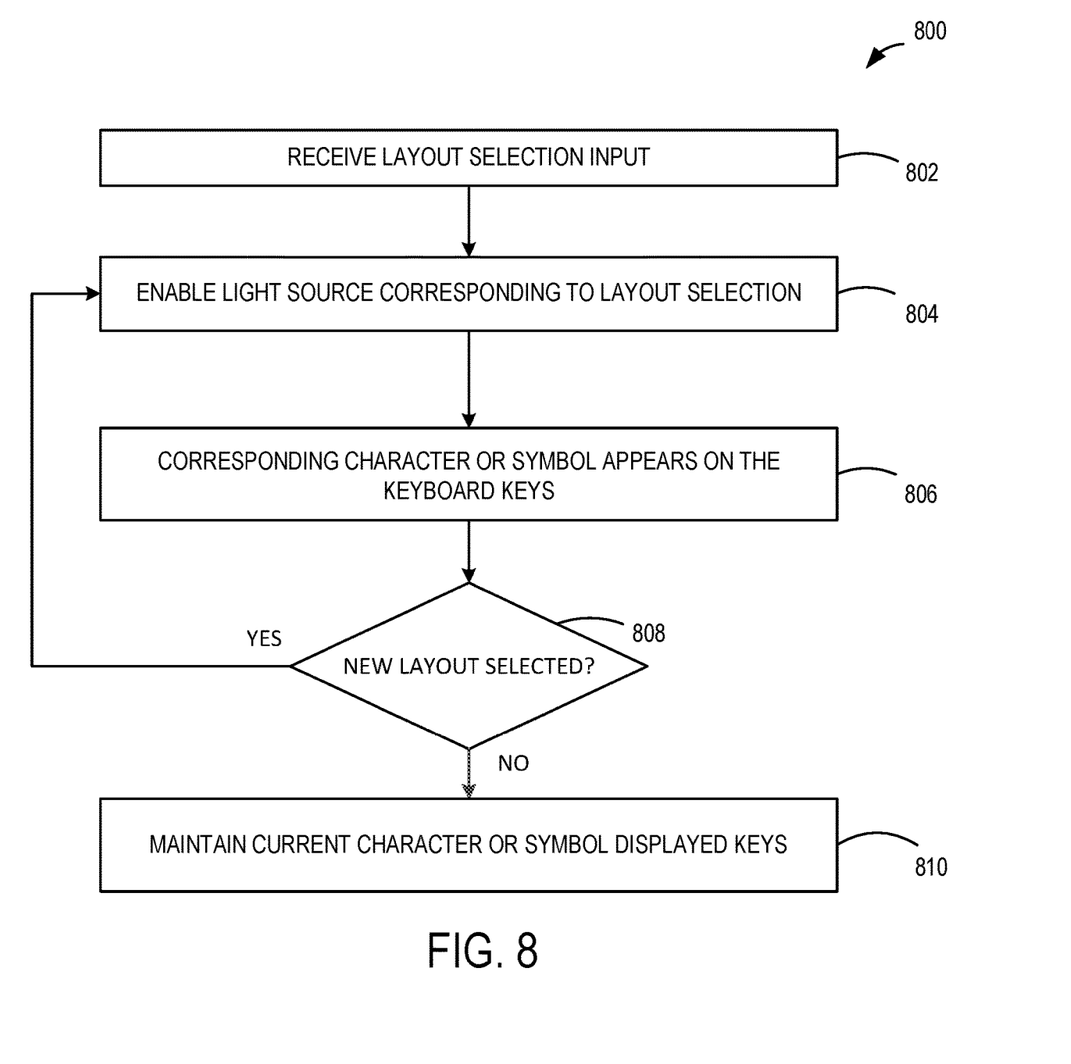
FIG. 8 is a flowchart illustrating operations for selectable layouts for a keyboard according to various embodiments.

Thus, various examples can be used to provide multiple layouts or configurations with the same physical keyboard. FIG. 8 illustrates a method 800 showing operation for selectable layouts for a keyboard according to various embodiments. The operations illustrated in the flowcharts described herein can be performed in a different order than is shown, can include additional or fewer steps and can be modified as desired or needed. Additionally, one or more operations can be performed simultaneously, concurrently or sequentially.

With reference to the method 800, a keyboard receives a layout selection input from a user at 802. For example, as described herein, a keyboard having a light reflector associated with the keys is capable of selectively displaying different characters or symbols for some or all of the keys. The layout selection input is a user selection of one of a plurality of keyboard layouts using a switch, button, or other selectable element in some examples. For example, a user can switch between a plurality of different language keyboards using a physical switch (e.g., a slider switch). It should be appreciated that in some examples, a semi-automatic or automatic layout selection is performed, such as based on the language of the application, the particular input requirements for the application, etc. That is, the keyboard layout selection is based on the language for input to control the computing device.

At 804, a light source corresponding to layout selection is enabled. For example, the light source 300 corresponding to a side (the reflective surface 304) of the prism 302 having the corresponding character for the selected layout is turned on (and all other lights sources 300 corresponding to that prism 302 are turned off). In some examples, each of the reflective surfaces 304, that is, each of the reflecting sides of the prisms, has a character (e.g., letter) or symbol corresponding to the language selected and for the particular key.

It should be noted that each key can correspond to the same letter in each of the languages, or different letters, such as based on the particular language layout, can correspond to different keys (e.g., non-English letters corresponding to English letters are on different keys in a non-QWERTY keyboard). Thus, the light source 300 for each of the keys having a changeable displayed character or symbol is selectively activated (turned on) to cause the appropriate character or symbol to appear on the physical keys at 804, such as for the selected language. The keys can be configured in different ways as described herein to allow for changing the displayed character or symbol.

At 808, a determination is made whether a new layout for the keyboard is selected. For example, a determination is made whether a layout selection input has changed, such as a change to a different language keyboard layout, by switching a layout switch (or switching applications). If a determination is made that a new layout is not selected for the keyboard, then at 810 the current character or symbol displayed keys are maintained. That is, the light source that is enabled is not changed.

If a determination is made that a new layout is selected, then the light source corresponding to the layout selection is enabled at 804. That is, a current light source is disabled (turned off) and another light source is enabled (turned on). As a result, some or all of the keys of the keyboard are caused to display different characters or symbols.

Thus, in some examples, the method 800 allows for a multilayout keyboard using a single physical keyboard.

Exemplary Operating Environment

Figure 9:
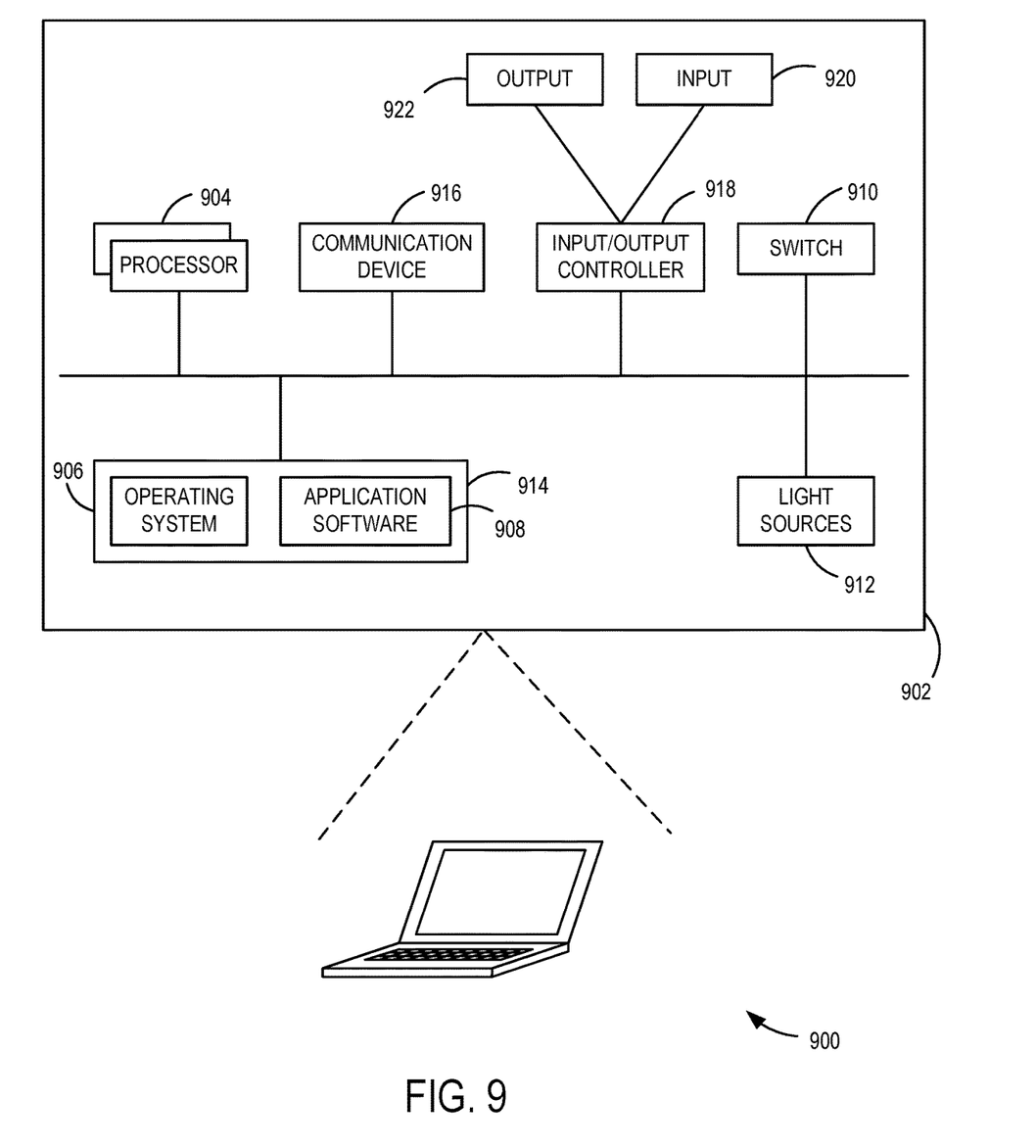
FIG. 9 illustrates a computing apparatus according to an embodiment as a functional block diagram.

The present disclosure is operable with a computing apparatus 902 according to an embodiment as a functional block diagram 900 in FIG. 9. In one example, components of the computing apparatus 902 may be implemented as a part of an electronic device according to one or more embodiments described in this specification. The computing apparatus 902 comprises one or more processors 904 which may be microprocessors, controllers or any other suitable type of processors for processing computer executable instructions to control the operation of the electronic device. Platform software comprising an operating system 906 or any other suitable platform software may be provided on the apparatus 902 to enable application software 908 to be executed on the device. According to an embodiment, keyboard layout selection can be accomplished by a hardware switch 910 or a software switch by enabling or disabling one or more light sources 912.

Computer executable instructions may be provided using any computer-readable media that are accessible by the computing apparatus 902. Computer-readable media may include, for example, computer storage media such as a memory 914 and communications media. Computer storage media, such as the memory 914, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 914) is shown within the computing apparatus 902, it will be appreciated by a person skilled in the art, that the storage may be distributed or located remotely and accessed via a network or other communication link (e.g. using a communication interface 916).

The computing apparatus 902 may comprise an input/output controller 918 configured to output information to one or more input devices 920 and output devices 922, for example a display or a speaker, which may be separate from or integral to the electronic device. The input/output controller 918 may also be configured to receive and process an input from the one or more input devices 920, for example, a keyboard, a microphone or a touchpad. In one embodiment, the output device 922 may also act as the input device 920. An example of such a device may be a touch sensitive display. The input/output controller 918 may also output data to devices other than the output device 922, e.g. a locally connected printing device. In some embodiments, a user may provide input to the input device(s) 920 and/or receive output from the output device(s) 922.

In some examples, the computing apparatus 902 detects voice input, user gestures or other user actions and provides a natural user interface (NUI). This user input may be used to author electronic ink, view content, select ink controls, play videos with electronic ink overlays and for other purposes. The input/output controller 918 outputs data to devices other than a display device in some examples, e.g. a locally connected printing device.

NUI technology enables a user to interact with the computing apparatus 902 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 902 is configured by the program code when executed by the processor(s) 904 to execute the embodiments of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A keyboard comprising:
 a plurality of depressible keys;
 a light reflector positioned under at least some keys of the plurality of depressible keys;
 a plurality of light sources configured to emit light towards the light reflectors, the light impinging on one of a plurality of reflective surfaces of the light reflectors, wherein the light reflector reflects the light impinging on the reflective surface towards a corresponding key of the plurality of depressible keys under which the light reflector is positioned to cause a character or symbol to appear on a surface of the plurality of depressible keys; and a switch configured to control selectively enabling each of the light sources of the plurality of light sources to change the character or symbol appearing on the surfaces of the plurality of keys.

Other examples include:

A keyboard comprising:
  a plurality of depressible keys with changeable characters or symbols to define a plurality of different keyboard layouts;
  a plurality of light sources and corresponding light reflectors positioned under the plurality of depressible keys and selectively controllable to generate structured light to form the characters or symbols; and
  a switch configured to receive a user input to change between the different keyboard layouts by changing an activation state of the plurality of light sources.

Other examples include:

A method for selecting a layout for a keyboard, the method comprising:
  receiving a layout selection input defining a layout for a keyboard having a plurality of depressible keys, the layout selection defining characters or symbols to appear on the plurality of depressible keys; and
  enabling light sources under the plurality of depressible keys and corresponding to the layout selection, the characters or symbols corresponding to the layout selection caused to be displayed on the plurality of keys by reflecting light from the lights sources to the plurality of depressible keys using a plurality of light reflectors.

Alternatively, or in addition to the other examples described herein, examples include any combination of the following:
  wherein the light reflector comprises a prism.
  wherein the plurality of reflective surfaces of the prism each have a different one of the characters or symbols etched thereon.
  further comprising a mask between the plurality of lights sources and the light reflectors, the mask generating a structure light pattern to form the character or symbol.
  further comprising a plurality of light configuration elements on a bottom surface of the plurality of depressible keys and configured to generate structured light to form the character or symbol when the light impinges thereon, the character or symbol being different for each of the light configuration elements on the bottom surfaces of the depressible keys.
  wherein the switch is configured to control display of a plurality of keyboard layouts by the selective enabling of each of the light sources of the plurality of light sources, wherein the plurality of keyboard layouts comprise different country keyboard layouts having letters in different languages corresponding to the different countries.
  wherein the plurality of light sources comprises a separate light source corresponding to and directing light to each of a different one of the reflective surfaces of the prism.
  wherein the switch is a mechanical switch operable by the user to change the keyboard layout.
  wherein the plurality of different keyboard layouts comprises a plurality of different country keyboard layouts having different characters or symbols.
  wherein the plurality of light sources and corresponding light reflectors are positioned to illuminate the plurality of depressible keys to cause the characters or symbols to appear along a portion of a top surface of the plurality of depressible keys.
  wherein the changeable characters or symbols appear along a same portion of a corresponding one of each of the plurality of depressible keys.
  wherein the changeable characters or symbols appear along a different portion of a corresponding one of each of the plurality of depressible keys.
  wherein the light reflectors comprise prisms each having a plurality of reflective surfaces to reflect light from the plurality of light sources to a bottom surface of the plurality of depressible keys.
  further comprising a mask between the plurality of lights sources and corresponding light reflectors, the masks configured to generate structured light patterns corresponding to the changeable characters or symbols.
  wherein the masks between each of the plurality of lights sources and corresponding light reflectors are different to generate different structured light patterns corresponding to different ones of the changeable characters or symbols.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 904 together with the computer program code stored in memory 914 constitute exemplary processing means for allowing switching between multiple keyboard layouts.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A keyboard comprising:
   a plurality of depressible keys;
   a light reflector positioned under at least some keys of the plurality of depressible keys;
   a plurality of light sources configured to emit light towards the light reflector, the light impinging on one of a plurality of reflective surfaces of the light reflector, wherein the light reflector reflects the light impinging on the reflective surfaces towards a corresponding key of the plurality of depressible keys under which the light reflector is positioned to cause a character or symbol to appear on a surface of the corresponding key, wherein each reflective surface corresponds to illumination of a different character or symbol of the corresponding key, and wherein the plurality of light sources comprises a separate light source directing light to each of a different reflective surface of the plurality of reflective surfaces; and
   a switch configured to control selectively enabling each of the separate light sources of the plurality of light sources to change the character or symbol appearing on the surfaces of the plurality of keys.

2. The keyboard of claim 1, wherein the light reflector comprises a prism.

3. The keyboard of claim 2, wherein the plurality of reflective surfaces of the prism each have a different one of the characters or symbols etched thereon.

4. The keyboard of claim 1, further comprising a mask between the plurality of lights sources and the light reflectors, the mask generating a structure light pattern to form the character or symbol.

5. The keyboard of claim 1, further comprising a plurality of light configuration elements on a bottom surface of the plurality of depressible keys and configured to generate structured light to form the character or symbol when the light impinges thereon, the character or symbol being different for each of the light configuration elements on the bottom surfaces of the depressible keys.

6. The keyboard of claim 1, wherein the switch is configured to control display of a plurality of keyboard layouts by the selective enabling of each of the light sources of the plurality of light sources, wherein the plurality of keyboard layouts comprise different country keyboard layouts having letters in different languages corresponding to the different countries.

7. The keyboard of claim 2, wherein a prism is positioned below each depressible key of the plurality of depressible keys and the separate light sources correspond to and direct light to each of a different one of the reflective surfaces of the prism below each depressible key.

8. A keyboard comprising:
   a plurality of depressible keys with changeable characters or symbols to define a plurality of different keyboard layouts;
   a plurality of light sources and corresponding light reflectors positioned under the plurality of depressible keys and selectively controllable to generate structured light to form the characters or symbols on corresponding keys of the plurality of depressible keys, each light reflector having a plurality of reflective surfaces and wherein each reflective surface corresponds to illumination of a different character or symbol of each of the corresponding keys, and wherein the plurality of light sources comprises a separate light source directing light to each of a different reflective surface of the plurality of reflective surfaces; and
   a switch configured to receive a user input to change between the different keyboard layouts by changing an activation state of the plurality of light sources.

9. The keyboard of claim 8, wherein the switch is a mechanical switch operable by the user to change the keyboard layout.

10. The keyboard of claim 8, wherein the plurality of different keyboard layouts comprises a plurality of different country keyboard layouts having different characters or symbols.

11. The keyboard of claim 8, wherein the plurality of light sources and corresponding light reflectors are positioned to illuminate the plurality of depressible keys to cause the characters or symbols to appear along a portion of a top surface of the plurality of depressible keys.

12. The keyboard of claim 11, wherein the changeable characters or symbols appear along a same top portion of each key of the plurality of depressible keys.

13. The keyboard of claim 11, wherein the changeable characters or symbols appear along a different top portion of each key of the plurality of depressible keys.

14. The keyboard of claim 8, wherein the light reflectors comprise prisms each having a plurality of reflective surfaces to reflect light from the plurality of light sources to a bottom surface of the plurality of depressible keys.

15. The keyboard of claim 14, further comprising a mask between the plurality of lights sources and corresponding light reflectors, the masks configured to generate structured light patterns corresponding to the changeable characters or symbols.

16. The keyboard of claim 15, wherein the masks between each of the plurality of lights sources and corresponding light reflectors are different to generate different structured light patterns corresponding to different ones of the changeable characters or symbols.

17. A method for selecting a layout for a keyboard, the method comprising:
   receiving a layout selection input defining a layout for a keyboard having a plurality of depressible keys, the layout selection defining characters or symbols to appear on the plurality of depressible keys; and
   enabling light sources under the plurality of depressible keys and corresponding to the layout selection, the characters or symbols corresponding to the layout selection caused to be displayed on the plurality of keys by reflecting light from the lights sources to the plurality of depressible keys using a plurality of light reflectors, each light reflector having a plurality of reflective surfaces, wherein each reflective surface corresponds to illumination of a different character or symbol of a corresponding key of the plurality of depressible keys, and wherein the plurality of light sources comprises a separate light source directing light to each of a different reflective surface of the plurality of reflective surfaces.

18. The method of claim 17, wherein receiving a layout selection input comprises receiving a user input at a physical switch of the keyboard.

19. The method of claim 17, wherein the plurality of light reflectors comprises a plurality of prisms having a plurality reflective surfaces.

20. The method of claim 17, further comprising a plurality of keyboard layouts corresponding to a plurality of layout selections, the plurality of different keyboard layouts comprises a plurality of different country keyboard layouts having different characters or symbols.

* * * * *